United States Patent [19]

Inzinna

[11] Patent Number: 4,897,146
[45] Date of Patent: Jan. 30, 1990

[54] APPARATUS AND METHOD FOR FABRICATING STRUCTURAL PANELS HAVING CORRUGATED CORE STRUCTURES AND PANEL FORMED THEREWITH

[75] Inventor: Louis P. Inzinna, Scotia, N.Y.
[73] Assignee: General Electric Company, Schenectady, N.Y.
[21] Appl. No.: 149,270
[22] Filed: Jan. 28, 1988
[51] Int. Cl.[4] .................... B32B 31/12; B32B 31/20
[52] U.S. Cl. ................................ 156/462; 156/471; 156/473; 156/499
[58] Field of Search ............ 156/201, 205, 208, 210, 156/292, 309.9, 322, 462, 470, 473, 499, 471

[56] References Cited

U.S. PATENT DOCUMENTS

| | | | |
|---|---|---|---|
| 2,193,052 | 3/1940 | Atwater | 156/205 |
| 2,410,744 | 11/1946 | Powers | 156/471 |
| 2,793,676 | 5/1957 | Hubmeier | 156/462 |
| 3,682,736 | 8/1972 | Akamatsu | 156/210 |
| 3,723,222 | 3/1973 | Kurita | 156/205 |
| 3,811,987 | 5/1974 | Wilkinson et al. | 156/497 |
| 3,833,440 | 9/1974 | Kashiwa et al. | 156/244 |
| 3,837,973 | 9/1974 | Asakura et al. | 156/470 |
| 3,854,861 | 12/1974 | Worrall | 425/504 |
| 3,893,879 | 7/1975 | Ito et al. | 156/164 |
| 3,932,248 | 1/1976 | Keaton | 156/210 |
| 4,113,909 | 9/1978 | Beasley | 428/116 |
| 4,164,389 | 8/1979 | Beasley | 425/406 |
| 4,267,223 | 3/1981 | Swartz | 428/172 |
| 4,315,050 | 2/1982 | Rourke | 428/116 |
| 4,358,498 | 11/1982 | Chavannes | 156/205 |

Primary Examiner—George F. Lesmes
Assistant Examiner—J. Davis
Attorney, Agent, or Firm—William H. Steinberg; James C. Davis Jr.; Paul R. Webb II

[57] ABSTRACT

An apparatus and method for continuously fabricating lightweight structural panels and the structural panel fabricated thereby are provided, the apparatus being capable of heating a core sheet to a temperature at which the sheet will be plastically deformable such that a corrugation forming means comprising a cylindrical forming drum having a plurality of annular recesses and a plurality of forming mandrels will form a plurality of axially extending corrugations. The fabricating apparatus is further provided with heaters to heat the surfaces of the core sheet, and one or two skin sheets to be bonded to the core sheet, the core sheet being heated to a process temperature at which the surfaces of the thermoplastic sheet become tacky and exhibit adhesive properties, and contact surfaces of the skin sheet or sheets being heated to a temperature below the core sheet process temperature, whereupon pressure applied between the skin sheets and the corrugated core sheet produces a self-adhesive bond between the sheets and forms a panel. The outer surfaces of the skin sheets are protected by maintaining these surfaces at sufficiently cool temperatures to resist distortion. The apparatus and method are especially suitable for use with glass-reinforced thermoplastic-composite sheet stock of indefinite length.

11 Claims, 3 Drawing Sheets

APPARATUS AND METHOD FOR FABRICATING STRUCTURAL PANELS HAVING CORRUGATED CORE STRUCTURES AND PANEL FORMED THEREWITH

BACKGROUND OF THE INVENTION

1. Field of the Invention

The present invention relates to an apparatus and method for fabricating lightweight structural panels having a corrugated core structure. The present invention also relates to a structural panel fabricated from thermoplastic sheet stock of indefinite length using the apparatus and method of the present invention.

2. Background of Related Art

Structural panels made of thermoplastic materials or glass-reinforced thermoplastic materials and having expanded core sections have been experiencing increased use in the automotive/trucking industry as well as in the building and construction industry. This type of structural panel exhibits the desirable characteristic of providing high strength at low weight, not readily available when using various other conventional materials. Thermoplastic or glass-reinforced thermoplastic (thermoplastic-composite) materials also provide the additional advantage of increased resistance to corrosion.

Methods for forming structural panels are known which employ thermoplastic sheets of fixed length and width, the maximum dimensions of which are dictated by the size of the mold plates and platens used therein. Such methods can be characterized as discrete operations in the sense that the apparatus runs through a predetermined cycle for each panel formed, and no capability is provided for continuous processing.

Continuous-type processes for forming thermoplastic panels having corrugated core structures are also known. In one such known process, a core sheet may be passed between a pair of corrugation-forming drums shortly after the sheet has been extruded. The contacting and bonding of the outer sheets occurs nearly immediately after the extrusion of the outer sheets such that the bonded sheets must follow the processing path around the circumference of the drums, the structure finally being formed into a flat panel at a later stage in the processing. Such a process suffers from the disadvantage that the core sheet is moved around several drums and is bent in two different directions after the corrugation is formed. Such bending induces undesirable stresses and distortions in the corrugations.

In another known continuous-type process, two outer sheets are bonded to a corrugated core sheet in which the upper and lower crests of the corrugations are formed in a direction transverse to the axial processing direction of the machine. A lower outer sheet is bonded to the core sheet by way of a relatively sophisticated and complex endless loop conveyor having a series of heater-bearing projections which are synchronized with the travel of the core sheet in a manner such that the projections will mate with the lower crests of the transverse corrugations to provide the heat and pressure necessary to effect the bonding. A top outer sheet is bonded to the core sheet by heating the outer surface of the top sheet with heated rollers and applying pressure between the outer sheet and the upper crests of the corrugations.

Such a process suffers the disadvantage that the method of bonding the top sheet to the core sheet is likely to induce distortions in the surface as the heat is applied from above the top sheet, thereby heating the exposed surface. Further, such a process requires a relatively complex machine.

It is therefore an object of the present invention to provide an apparatus having a continuous processing capability for making thermoplastic or thermoplastic-composite panels of indefinite length.

It is a further object of the present invention to provide an improved method of fabricating a structural panel of indefinite length which can be used with monolithic sheets made of either thermoplastic or thermoplastic-composite materials.

Another object of the present invention is to provide a high strength, low weight structural panel having a corrugated core sheet and an outer skin sheet, at least one of the sheets being a thermoplastic-composite or glass reinforced sheet.

Yet another object of the present invention is to provide an improved apparatus and method for fabricating a structural panel which produces a uniform corrugated structure having an outer skin sheet or sheets in a single automated continuous process.

It is a further object of the present invention to provide a structural panel, and an apparatus and method for producing said panel, having at least one outer skin sheet which is substantially free from surface distortion and is of a suitable quality surface finish and appearance whereby paint may be applied to the surface and whereby the panel can be used as an exposed surface in automobile, trucking or other applications requiring a glassy smooth surface finish.

SUMMARY OF THE INVENTION

The above and other objects of the present invention and the attendant advantages are accomplished by an apparatus having means for advancing a monolithic core sheet and at least one monolithic skin sheet in an axial machine processing direction. The core sheet is adapted to be heated to a process temperature at which the sheet may be plastically deformed and to a process temperature at which the thermoplastic or thermoplastic-composite material becomes tacky and exhibits adhesive properties. Corrugations in the core sheet are formed by a transversely mounted rotating cylindrical forming drum having a plurality of annular channels adapted to cooperate with a like number of associated forming mandrels which are axially aligned with the channels and are partially encompassed within the associated channels. When the core sheet is advanced through the space between the mandrels and the drum channels, the core sheet is corrugated by forming sets of upper and lower crests axially oriented in the directions of travel of the core sheet. An outer skin sheet is advanced on a conveyor located underneath the forming mandrels, and an upper or contact surface of the skin sheet is heated to a temperature below the process temperature of the core sheet. The spacing between the conveyor and the forming drum is set such that the adjacent surfaces of the corrugated core sheet and the skin sheet will be brought into contact at selected areas by the drum to effect a self-adhesive bond between the sheets.

Where it is desired to fabricate structural panels having skin sheets on both sides of the corrugated core sheet, the apparatus may be provided with a means for advancing an upper sheet, means for heating a contact surface of the upper sheet, and means for pressing the upper skin sheet against the corrugated core sheet.

In accordance with the present invention, th use of a forming drum and associated finger-like forming mandrels for producing axially extending corrugations in a core sheet of a thermoplastic or thermoplastic-composite material provides several significant advantages in fabricating structural panels. The skin sheet and core sheet may be advanced toward the nip between the forming drum and conveyor means at a fairly shallow angle with respect to one another, thereby requiring only minimal bending or deflection of the core sheet prior to having corrugations formed therein and requiring no bending of the core sheet once the corrugations are formed and the core sheet is bonded to the lower skin sheet. Elimination of bending after the bonding of the sheets is especially advantageous when high strength thermoplastic-composite sheets are used in fabricating panels, and more particularly when a thermoplastic-composite sheet material is used as a core sheet, wherein such bending of the panel would otherwise induce undesirable stresses in the panel.

Heaters may be disposed in close proximity to the sheets as they are advanced through the machine to facilitate the processing of sheets into fabricated panels using preformed sheet stock and eliminating any need to process the thermoplastic sheets directly from an extrusion process, and enables a preformed sheet stock having a glassy smooth surface finish to be utilized such that the process yields a finished panel having that glassy smooth exterior surface.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views, and wherein.

DETAILED DESCRIPTION OF THE PREFERRED EMBODIMENTS

Figure 1:
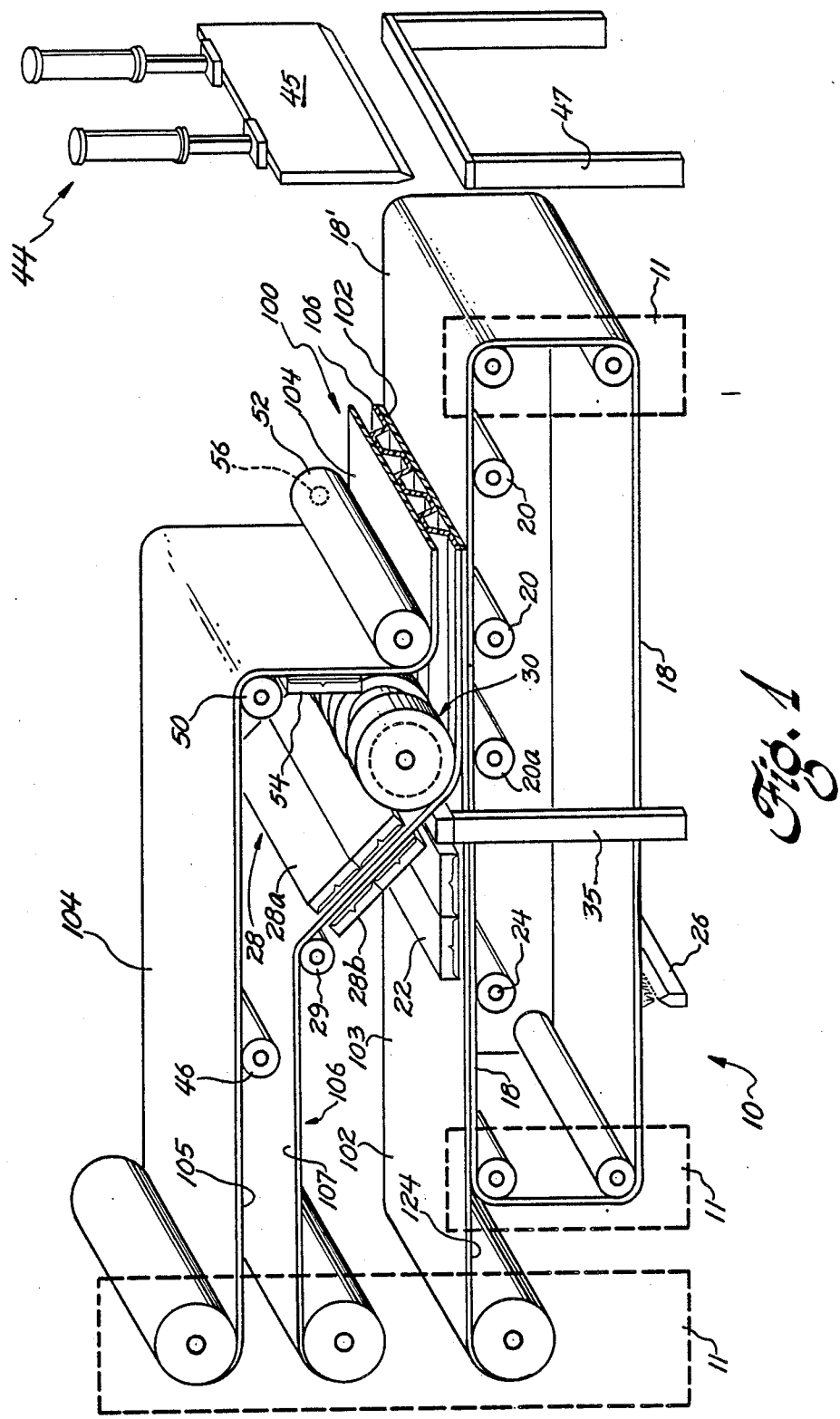
FIG. 1 is a partial perspective view of the structural panel fabricating apparatus of the present invention, as shown with sheet stock in position.

Referring initially to FIG. 1, the apparatus for fabricating structural panels according to a preferred embodiment of the present invention is designated generally by numeral 10. It is to be recognized that the apparatus 10 according to the invention includes a suitable supporting frame shown diagrammatically by phantom rectangles and identified by reference character 11. The details of supporting frame 11 are not shown in the Figures because they form no part of the novel inventive features of the present invention, but it should be apparent that suitable framework 11 extends on both sides of the apparatus 10.

For ease in describing the positions of the certain components of apparatus 10, as well as the mode of operation and method of fabricating structural panels, an axial machine processing direction will be referred to, this axial direction being designated by arrow "A". Also, to more easily distinguish the components of the fabricated structural panel from the elements of the apparatus, the structural panel and its elements are designated with reference characters in the "100" series, while the elements of the apparatus are designated by reference characters in the "10" series.

Figure 2:
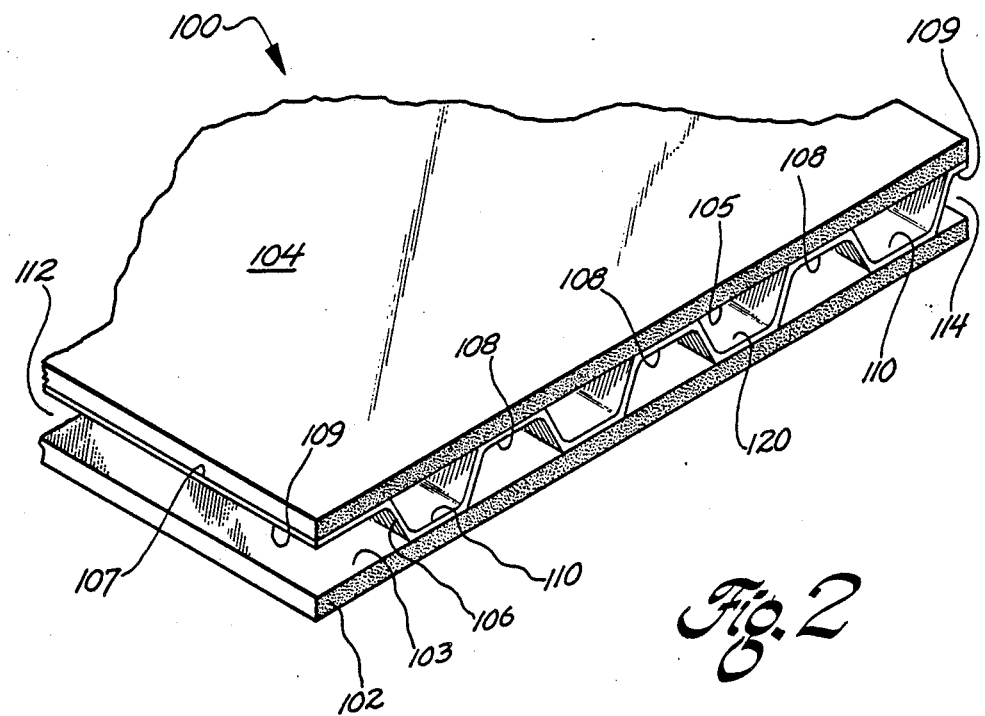
FIG. 2 is a fragmentary perspective view of a panel of the present invention fabricated by the apparatus shown in FIG. 1, partially in cross section.

Referring to FIG. 1 it will be seen that the structural panel 100 is formed from a plurality of sheets of monolithic thermoplastic or thermoplastic-composite material, including a lower planar skin sheet 102, upper planar skin sheet 104, and a central core sheet 106 are caused to be processed through apparatus 10 wherein the sheets are formed into the structural panel 100, shown most clearly in FIG. 2. As shown in FIG. 2, lower skin sheet 102 and upper skin sheet 104 are bonded to opposite sides of the core sheet 106. However, because the core sheet 106 has been corrugated as a result of having been advanced through the apparatus, the upper and lower sheets 104, 102, respectively, contact upper and lower sets of crests 108, 110 of the corrugated sheet 106 between its outermost edges. The panel 100 retains its flat surface on both sides, to this end, at one side edge 112 of the panel 100, the lower surface 105 of sheet 104 is bonded to the upper surface 107 of corrugated sheet 106 and the lower surface of the corrugated sheet 106 is spaced from the upper surface 103 of the lower sheet 102. At the other side edge 114 of the panel, the upper surface 103 of the lower sheet 102 is spaced from the underside 109 of the corrugated panel 106, whose upper side 107 is bonded to the lower surface 105 of the upper sheet 104.

It should be noted at the outset that the modifiers "lower" and "upper" used in referring to positional relationship of the elements as shown in the drawings should in no way be construed as limiting the orientation of the individual panels or the finished structural panel 100 in any particular application.

It should also be noted that while a structural panel 100 has been depicted having a lower skin sheet 102 and an upper skin sheet 104 bonded to a corrugated core sheet 106, where there is no requirement for planar skin sheets on both sides of corrugated core sheet 106, either the lower or the upper skin sheet may be advantageously eliminated.

The core sheet 100, and upper and lower skin sheets 102, 104, respectively, may be discrete prefabricated sheets of a fixed length, fed consecutively in the apparatus to accomplish continuous processing. The sheets may also be of indefinite length fed to the fabricating apparatus from rolls of prefabricated sheet material. Alternatively, the sheets may be fed directly to the fabricating apparatus from an extruder. In any event, the method of fabrication of the panels is preferably continuous and therefore the sheets are not limited in size to any specific length.

The sheet stock material of both the skin sheets 102 and 104 and the core sheet 106 is a thermoplastic material, and preferably a glass reinforced material; which is also referred to herein as a thermoplastic-composite material. Reinforced thermoplastic-composite sheets provide improved strength over unreinforced thermoplastic sheets. Examples of thermoplastic materials which can be used are polycarbonate, polybutylene terephthalate, and a blend of bisphenol-A-polycarbonate and polybutylene terephthalate, available from the General Electric Company as Lexan, Valox, and Xenoy, respectively, all registered trademarks of the General Electric Company. Where glass reinforced thermoplastic-composite sheets are used, the working temperatures will be in a generally higher range than the working temperatures of unreinforced thermoplastic sheets.

The apparatus and method disclosed in the present invention are especially advantageously used in processing sheets of thermoplastic-composite material into structural panels, as such sheets are generally less flexible and are less able to withstand severe bending and will be described in greater detail with reference to the apparatus 10 shown in FIG. 1. The three sheets, skin sheets 102, 104 and core sheet 106, are fed from independent rolls 12, 14, 16, respectively, to the forming apparatus 10. Skin sheet 102 is advanced in axial direction A by a conveyor which may be in the form of a continuous belt 18 suitably driven by a plurality of rollers 20, at least one of which is connected to a suitable power source. Such sheet conveyors are generally known in the art, and, accordingly the operation thereof will be readily apparent to those skilled in the art, it being understood that the conveyor must be capable of advancing skin sheet 102 at a specific predetermined rate. A suitable type of conveyor advantageously may be of the "endless belt" type, particularly where the skin sheets 102 and 104 and core sheet 106 are fed continuously from rolls.

The upper surface 18' of belt 18 is preferably in a substantially horizontal orientation. Sheet 102 is transported from its roll 14 and over rollers 20, such that the lower surface 124 of sheet 102 is caused to contact and rest on the surface 18' of the conveyor belt. Sheet 102 is thus transported by belt 18 as it is driven in the direction of arrow A. Belt 18 advances skin sheet 102 through a heating stage which includes a heater 22 located above an upper contact surface 103 of sheet 102 as viewed in the drawing. Surface 103 which is conveyed beneath heater 18 is the parallel flat inner surface of skin sheet 102 disposed facing away from the surface of the conveyor as viewed in the drawing.

Heater 22 is supported slightly above and across the transverse dimension of belt 18 such that it causes the contact surface 103 to be heated as it passes beneath the heater 22. Heating of the first contact surface 103 in this manner will improve the bonding of the skin sheet 102 to the upper adjacent core sheet 106 at the next stage of the process. Although various types of heaters may be suitable for this application, the apparatus 10 of the preferred embodiment employs an infrared heater or heaters to accomplish the desired function in a manner well known in the art.

For several anticipated applications of the structural panel 100 of the present invention, the exterior appearance of the panel is of substantial importance. It should be apparent in viewing FIG. 1 that outer surface 124 of skin sheet 102 will become one of the exposed surfaces of structural panel 100. It is therefore generally desirable to maintain outer surface 124 free from distortion to the greatest extent possible. Therefore, contact surface 103 is heated preferably to a temperature at which the skin sheet 102 will enhance or improve the quality of the bonding between skin sheet 102 and core sheet 106, but will also substantially resist distortion of the outer surface 124. A suitable temperature would be below temperatures approaching the melting temperature of the material. Temperatures approaching a melting temperature would further enhance the contribution of the skin sheet to the quality of the bonding by rendering the surface tacky to touch, but would also soften the material. Care must be taken to keep the temperature below the softening point, as the sheet will begin to lose its structural integrity. Such higher temperatures might be employed where surface quality is not of substantial importance.

The apparatus of the present invention and method of fabrication minimizes the tendency of such heating to cause distortion in the sheet by controlling the temperature of the belt 18. To this end, conveyor belt 18 is designed such that the surface of the belt 18 during operation and when in contact with sheet 102, is maintained at all times at a relatively low temperature compared to that of the heated sheet 102. This may be accomplished in any number of ways. In one embodiment, one or more of conveyor rollers 20 is a chilled roller, using a chilling means 24 of a type known in the art. In another embodiment, a blower or blowers 26 may be used to blow cool air against the belt 18. Still another embodiment provides an endless belt of a length sufficient to allow the belt to air cool to the desired temperature during its return trip before re-engaging the outer surface 124 of skin sheet 102. The heating means 22, being disposed above contact surface 103 of sheet 102, will heat only the contact surface 103 of skin sheet 102, effectively producing a hotter temperature at the top surface 103 of the sheet than that at the bottom surface 124. The contact surface 103 is hot enough to enhance bonding as it advances to the bonding station and, on the other hand, the outer surface 124 is sufficiently cool to resist substantial distortion of the sheet.

Heater 22 is disposed as close as possible to the bonding stage to minimize heat loss during transport. The close proximity of heating means 22 to the bonding stage of apparatus 10 where lower skin sheet 102 will be bonded to core sheet 106 efficiently minimizes the temperature to which contact surface 103 is to be heated, as very little heat will be lost by the surface in the short distance it will travel before being bonded.

Certain applications for structural panels of the present invention require not only substantially distortion free surfaces but also high quality surface finishes. One anticipated application for a panel 100 of this type is as a body panel for an automobile. The surface finish for such use must be glassy smooth (sometimes referred to informally in the industry as a "Class A" finish) such that paint will adhere to the surface, and such that the resulting appearance is comparable to the appearance of materials presently in use in the automobile industry. The cooling of the conveyor belt 18 of the conveyor system assists in minimizing distortions and thus protects the outer surface 124 of the skin sheet 102 of a panel 100 prepared t automobile industry standards.

At the same time as skin sheet 102 is advanced past heater 22, core sheet 106 is also advanced in the axial machine direction A. In the preferred embodiment depicted, the direction of travel of core sheet 106 will have a vertical component as well as a horizontal component, with core sheet 106 approaching skin sheet 102 at a relatively shallow angle of approximately 30°.

Core sheet heating means 28 preferably employs infrared heaters identical or similar to the infrared heater used to heat contact surface 103 of skin sheet 102.

In this preferred embodiment, heaters 28a and 28b are disposed such that sheet 106 is advanced between the heaters which extend across the width of both the upper surface 107 and the lower surface 109 of core sheet 106. Heaters 28a, 28b sever the heat core sheet 106 to a temperature at which the sheet is capable of being plastically deformed, and also to a temperature at which the surfaces 107, 109 of the sheet become tacky and exhibit adhesive properties.

This temperature, which will be referred to herein as a process temperature, will vary depending on the type of thermoplastic material being used. In general, the process temperature should be near the melting temperature of the particular material to assure adequate tackiness and to facilitate the corrugation forming process. At temperatures near the melting temperature, a sheet of thermoplastic material will be soft (or pliable) and sticky, while still remaining in sheet form. A process temperature for a monolithic Xenoy core sheet would be on the order of 50020 F. (270° C.).

The positioning of heaters 28a, 28b in close proximity to both sides of core sheet 106 provides a more even heating of the core sheet, thereby facilitating the corrugation forming step, and also ensuring that both the upper and lower surface 107, 109 of core sheet 106 exhibit the adhesive properties required to ensure adequate bonding of a skin sheet to both sides of the core sheet where the finished structural panel 100 includes both a lower and an upper skin sheet. If only open skin sheet is to be bonded to core sheet 106 at a later stage, one of the heaters 28a, 28 b may be deleated, provided that the remaining heater 28a or 28b as the case may be, sufficiently heats the core sheet 106 to enable corrugation of the layers in the next stage.

After advancing past the heaters 28a, 28b, core sheet 106 is fed through a corrugation forming means comprising, in this preferred embodiment, a cylindrical forming drum 30. Drum 30 is shown most clearly in FIG. 3 and includes a plurality of annular recessed channels 32 formed between adjacent raised annular shoulders 37 formed by drum ends 36 and spacers 38. An associated plurality of finger-like mandrels 34 are held in position by a mandrel support frame 35 (FIGS. 1, 4).

Figure 3:
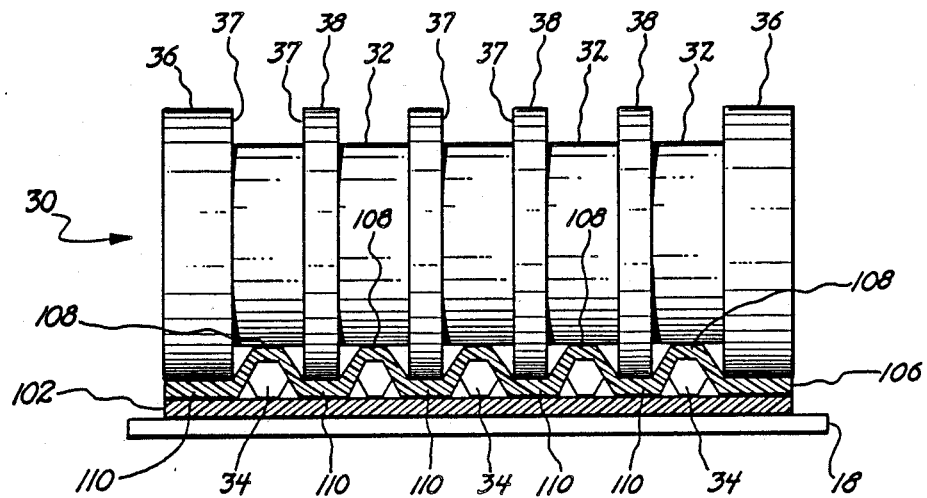
FIG. 3 is an elevational view of the drum of the apparatus of the present invention; with the stock sheet material shown in cross section and the drum supporting elements and conveyor details omitted for clarity
Figure 4:
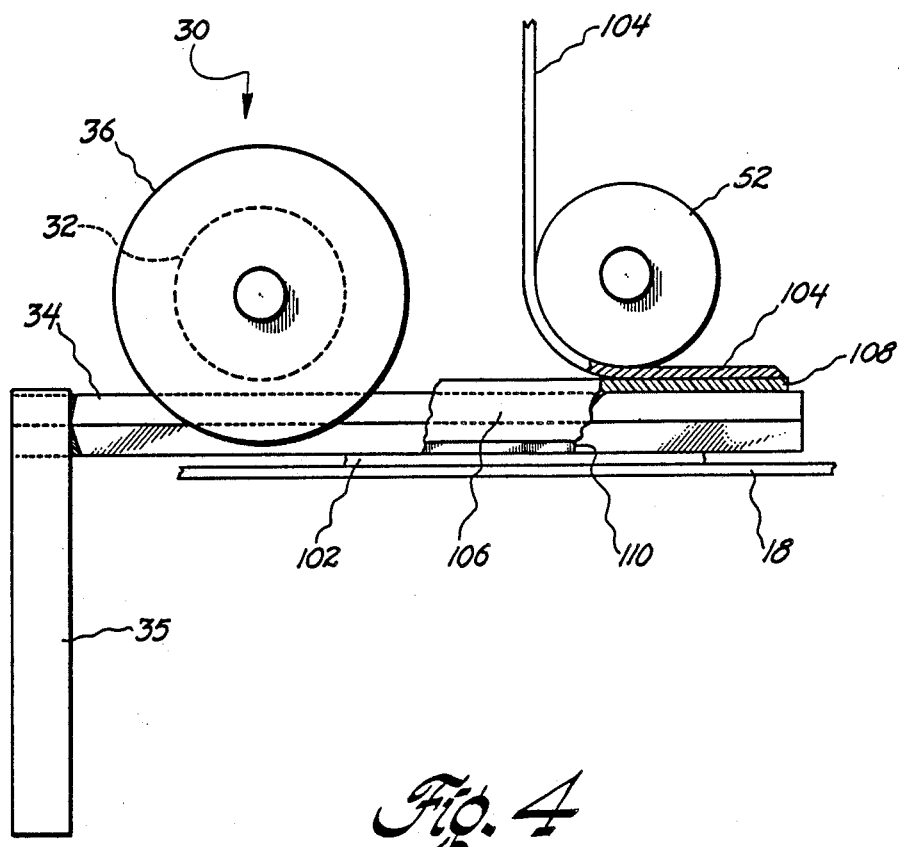
FIG. 4 is a side detail view of the corrugation forming and sheet bonding stations with the skin sheet, core sheet, and conveyor shown in fragmentary section.

Referring to FIG. 3, several spaced mandrels 34 are mounted on support frame 35, and extend in the direction of travel of the sheet material. Each mandrel element has a hexagonal shape in cross section and is positioned to extend beneath the drum 30 in an associated channel 32 and between skin sheet 102 and core sheet 106. One flat side of each mandrel is positioned parallel to the surface of sheet 102. This presents a corresponding, diametrically opposite flat side adjacent the lower surface of core sheet 106 and two angled sides by which the corrugation is to be formed.

The mandrels 34 are retained in relative position to their associated channels 32 such that core sheet 106 must be deformed in order to pass through the space provided between forming drum 30 and mandrels 34. Mandrels 34 are depicted as having substantially hexagonal cross-sectional shapes may be used for the mandrels as desired. This would largely depend on the desired profile of the corrugation.

Forming drum 30 is transversely mounted (with respect to axial machine direction A) and has a substantially horizontal axis of rotation. Core sheet 106 is forced into contact with lower skin sheet 102, as they are advanced by conveyor belt 18. Drum 30 is preferably rotated at a speed which is synchronized with the travel speed of belt 18 such that core sheet 106 and lower skin sheet 102 are advanced at substantially the same rate. The rotation of the drum 30 and the pressing of core sheet 106 against lower skin sheet 102 as they are advanced by belt 18 may comprise the means for advancing core sheet 106 in the panel fabrication process from core sheet feed roll 16 to the final stages where the structural panel 100 is completed.

The means for rotating drum 30 is not depicted, but various devices known in the art including electric motors would be suitable for this service. Alternatively, guide roller 29 may be power driven and used to advance core sheet 106 in axial direction A from feed roll 16.

The corrugation-forming elements and operation of apparatus 10 can best be described by referring first to FIG. 3. In FIG. 3, the forming drum 30 and the finger-like mandrels 34 are seen in elevation view and the arrow defining axial machine direction A is shown coming out of the page. The direction of travel of core sheet 106, skin sheet 102 and belt 18 would therefore also be out of the page toward the viewer.

Drum 30 contains a predetermined number of annular channels 32 preferably having substantially equal dimensions and spaced substantially equal distances apart from each other. The annular recesses 32 are defined by drum ends 36 and ring spacers 38 interposed between the recesses. The shoulders 37 of annular channels 32 are formed by the sides of these drum ends 36 and ring spacers 38. Spacers 38 preferably have the same outside diameter as ends 36, and the dimensions of spacers 38 as measured in the axial direction of drum 30 may be less than the corresponding dimension of the ends 36, as shown in FIG. 2, or may be equal to or greater than that dimension, depending on the corrugation profile desired for the core sheet. Likewise, although annular channels 32 are shown as having a constant diameter across the entire width of the channel, channels 32 may be tapered across their widths by using appropriately shaped shoulders 37 of ends 36 and ring spacers 38. This characteristic will also depend on the desired corrugation profile.

Core sheet 106 is fed over the top of mandrel support frame 35 and mandrels 34. Channels 32 in drum 30 are sized and shaped to accommodate the passage of sheet 106 over mandrels 34, but drum ends 36 and interposed ring spacers 38 will impose a downward force on core sheet 106. An upper set of crests 108 and a lower set of crests 110 are thus formed as the core sheet 106 is plastically deformed when passing between the forming elements, first over mandrels 34 and then under drum 30. As the core sheet continues to be fed between these elements, the upper lower sets of crests 108, 110 assume the shape of axially extending corrugations.

The surfaces of the mandrels 34 and drum 30 are preferably treated with a mold release agent to prevent heated core sheet 106 from sticking to these elements. Fluorocarbon mold release agents for high temperature molds, sold by several manufacturers, are suitable for use on these elements.

At the same time that the lower set of crests 110 are being formed by the downward force of drum ends 36 and spacers 38, these crests are brought into contact with the contact surface 103 of lower skin sheet 102, which passes underneath core sheet 106. As described previously, the lower surface 124 of core sheet 106 is heated to a process temperature at which the surfaces become tacky and exhibit adhesive properties, and contact surface 103 is heated to a temperature lower than this process temperature. Forming drum 30 is positioned at a distance above belt 18 whereby drum ends 36 and ring spacers 38 are spaced from the belt at a distance slightly less than the total thickness of core sheet 106 and lower skin sheet 102. Pressure is thus applied between lower skin sheet 102 and the lower set of crests 110 of core sheet 106. The pressure applied, when combined with the surface heating preparation, causes the sheets to bond together at the areas of contact between the contact surface 103 of lower skin sheet 102 and the lower set of crests 110 of core sheet 106. This type of bonding is sometimes referred to as hot tack adhesion. As can be seen in FIG. 1, the belt 18 is supported by one of the conveyor rollers 20a which provides a backing for belt 18, allowing the downward pressure of the drum ends 36 and ring spacers 38 to be maintained between the sheets.

Referring again to FIG. 1, it will be seen that the core sheet 106 is advanced at a relatively shallow angle. This is made possible because the mandrel support frame 35 and mandrels 34 are fairly unobtrusive elements on the feed side of the drum 30. The mandrel-and-drum type corrugation forming means therefore requires only minimal bending of the core sheet 106 prior to having corrugations formed therein and prior to the bonding of the core sheet 106 to lower skin sheet 102. The corrugation forming means, and the apparatus 10 as a whole, are preferably designed to entirely eliminate binding of the sheets after bonding is accomplished. This arrangement of the elements which reduces the amount of bending required becomes especially important where sheets of a thermoplastic-composite material are used to form the structural panel 100. The extra strength provided by the glass reinforcement makes these sheets more difficult to work with, and devices requiring the sheets to be bent after the bonding step are generally not suitable for use with thermoplastic-composite sheet stock.

When the desired final product is a panel having a corrugated core sheet and only one skin sheet, the panel formed is cooled on the belt 18 and cut by a suitable cutter 44 to the desired length (if a continuous feed is being employed). Where the desired end product is a panel having a skin sheet on both sides of the corrugated core sheet 106, further processing by the apparatus 10 is required.

As shown in FIG. 1, an upper skin sheet 104 is advanced along axial machine direction A, from a position above the feed core sheet 106. In this preferred embodiment, upper skin sheet 104 is advanced from feed roll 12 over support roller 46 and then past a first upper skin sheet roller 50 and a second upper skin sheet roller 52, which are positioned to advance upper skin sheet 104 into a contact with corrugated core sheet 106. Upper skin sheet 104 is preferably fed in a plane which is substantially parallel to lower skin sheet 102, and redirected between rollers 50, 52 to be advanced in a substantially perpendicular orientation to the lower skin sheet 102 and corrugated core sheet 106, and again redirected around roller 52 to run parallel to and in contact with the corrugated core sheet 106.

First upper skin sheet roller 50 is preferably heated to raise the temperature of upper skin sheet contact surface 105, which is preferably heated in a manner similar to contact surface 103 of lower skin sheet 102. The heated roller 50 will also facilitate the bending of the sheet around the roller 50 in changing the direction of sheet being fed. Heating means 54, preferably comprising an infrared-type heater, is provided to further heat upper skin sheet contact surface 105 to a temperature above ambient temperature, but sufficiently below the core sheet process temperature to withstand distortion.

Upper skin sheet 104 then passes around second upper skin sheet roller 52. This roller is preferably provided with a smooth, finished surface, which will aid in minimizing the distortion of the exterior surface of the upper skin sheet 104. Also for the purpose of minimizing distortion, roller 52 is preferably maintained at a cool temperature, and if necessary may be provided with a chilling means 56 of a type known in the art.

Mandrels 34 may actually be provided in a longer length to continue providing support for the upper set of crests 108 to maintain the shape of the corrugations formed until the corrugated core sheet 106 has cooled sufficiently to retain its shape without support. Roller 52 is preferably spaced from the set of mandrels 34 at a distance slightly less that the combined thickness of the corrugated core sheet 106 material and upper skin sheet 104. Proper spacing will result in a pressure being applied between the contact surface 105 of upper skin sheet 104 and the upper set of crests 108 of the corrugated core sheet 106 at the areas where contact is made. The pressure applied, in combination with the surface heating preparation which produces tackiness or adhesive properties on the core sheet surface, produces a bond between corrugated core sheet 106 and upper skin sheet 104.

Upper skin sheet 104 may be advanced or fed into contact with corrugated core sheet 106 by one of several different means. For example, any of rollers 46, 50, 52 may be driven rollers, and, where appropriate, may be referred to as a conveyor means for the skin sheet 104.

After the bonding of upper skin sheet 104 to core sheet 106 is effected, the structural panel 100 thus formed, having lower and upper skin sheets 102, 104 bonded to a corrugated core sheet 106 is advanced down the conveyor for cooling, and thereafter fed to a cutting station 44 (FIG. 1), for cutting to desired lengths. Shown essentially in schematic form, cutting station may comprise a hydraulically actuated blade 45 and a cutting platen 47.

The apparatus of the present invention lends itself well to the novel method for fabricating a structural panel 100 having an expanded or corrugated core sheet and at least one skin sheet bonded to the core sheet. The method is especially suitable for fabricating a finished structural panel having a surface with a minimum of distortions and a smooth finish.

In performing the method of the present invention, a first skin sheet 102 is advanced in an axial direction on a conveyor means maintained at a cool temperature. A contact surface 103 of the first skin sheet is heated at a first operating station by infrared heating means 18 to a temperature above ambient temperature but below a temperature where the sheet will become soft.

Belt 18 is preferably maintained at a temperature below this temperature by, for example, air blowers, schematically represented at 26 to keep the temperature of the outer surface of skin sheet 102 sufficiently cool to resist distortion.

A core sheet 106 is simultaneously advanced in an axial direction and toward the first skin sheet, preferably at a shallow angle thereto. Core sheet 106 is heated by infrared heaters 28a, 28b at a second operating station to a process temperature at which the surfaces of the sheet become tacky or sticky and will exhibit adhesive properties, and also at which the sheet will be plastically deformable. Core sheet 106 is then fed through a corrugation-forming station wherein a plurality of spaced, axially extending corrugations, comprising sets of axially extending upper and lower crests 108, 110 are formed in the sheet. The corrugation-forming station in the preferred embodiment of the apparatus 10 of the present invention comprises a transversely mounted forming drum 30 having a plurality of annular channels 32, and a plurality of finger-like mandrels 34 extending underneath the channels 32 in the drum 30.

Core sheet 106 is then pressed against and bonded to first skin sheet 102 by applying pressure to the areas where contact surface 103 of first skin sheet 102 is brought into contact with, in the depicted embodiment, the lower set of crests 110 of core sheet 106. This pressure is applied by portions of drum 30 identified as drum ends 36 and ring spacers 38 (FIG. 3), which are spaced from belt 18 at a distance slightly less than the total thickness of first skin sheet 102 and core sheet 106.

Second skin sheet 104 is also advanced in an axial direction from a position above core sheet 106. A contact surface 105 of this skin sheet is heated, preferably by a heated roller 50 and an infrared heater 54, to a temperature above ambient, but below the core sheet process temperature. Second skin sheet 104 is then directed around a cool roller 52, or chiller which contacts an outer surface of the second skin sheet 104, and presses sheet 104 into contact with core sheet 106. Pressure is exerted or applied after the corrugation stage at the areas of contact of second skin sheet 104 and the set of upper crests 108 of core sheet 106 to effect bonding therebetween.

The finished panel 100 is then further transported on the conveyor means. During this further transport it is cooled and subsequently directed to a cutting station 44 for cutting into required lengths.

While the present invention has been described with respect to preferred embodiments, it will be apparent to those skilled in the art that certain modifications and changes can be made without departing from the spirit and scope of the invention. It is therefore to be understood that the appended claims are intended to cover all such modifications and changes which fall within the true spirit and scope of the invention.

What is claimed is:

1. Apparatus for fabricating a lightweight structural panel having a thermoplastic or thermoplastic-composite corrugated core sheet and at least a first thermoplastic or thermoplastic-composite skin sheet bonded thereto comprising:

conveyor means for advancing a first skin sheet in an axial machine direction;

core sheet advancing means for advancing a core sheet in said axial machine direction;

first heating means disposed along the path of advancement of said core sheet for heating said core sheet to a process temperature at which a surface of said core sheet to be brought into contact with a first skin sheet becomes tacky and at which said core sheet is plastically deformable;

second heating means disposed along the path of advancement of said first skin sheet and adjacent said first skin sheet for heating a first contact surface of said first skin sheet to a temperature below said process temperature of said core sheet; and means for plastically deforming said core sheet and simultaneously bonding said core sheet to said first skin sheet, said means for deforming comprising a forming drum, said conveyor means and a plurality of forming mandrels, said forming mandrels comprising elongated members extending in the axial machine direction spaced apart from one another and spaced away from said conveyor means, permitting said first skin sheet to pass between said forming mandrels and said conveyor means, said drum having a plurality of annular channels, each of said channels partially encompassing a forming mandrel and cooperating therewith to form a plurality of axial extending corrugations, a portion of which extend between adjacent forming mandrels and are laminated to said first skin sheet during the forming of said corrugations in said core sheet.

2. An apparatus as defined in claim 1 wherein said core sheet advancing means comprises said forming drum, said drum being disposed in a position above said conveyor means, and wherein said core sheet will be advanced from a position above said conveyor means and said first skin sheet.

3. An apparatus as defined in claim 2 wherein said forming mandrels extend underneath a lower side of said drum for a predetermined distance, and said forming drum is adapted to advance said core sheet over said forming mandrels and under said forming drum.

4. An apparatus as defined in claim 3 wherein said forming mandrels extend under said core sheet a predetermined distance sufficient to provide support for maintaining a shape of said corrugations.

5. An apparatus as defined in claim 4 wherein said conveyor means comprises a conveyor belt having a substantially horizontally disposed upper travel surface, and a plurality of conveyor rollers disposed on a lower side of said upper travel surface, and wherein said outer surface of said first skin sheet will ride on said belt when said first skin sheet is advanced in said axial machine direction.

6. An apparatus as defined in claim 5 wherein said belt is adapted to maintain said outer surface of said first skin sheet at a temperature below the temperature to which said contact surface is heated.

7. An apparatus as defined in claim 1 wherein said conveyor means, said core sheet advancing means and said corrugation forming means are adapted to receive thermoplastic sheets of indefinite lengths.

8. An apparatus as defined in claim 2 further comprising:

a second skin sheet feeding means for advancing a second thermoplastic or thermoplastic-composite skin sheet in an axial direction, said second sheet feeding means being disposed in a position above said core sheet advancing means;

third heating means disposed adjacent said second sheet for heating a second contact surface of said second skin sheet to a temperature below said process temperature of said core sheet; and means for bonding said second contact surface of said second skin sheet to said core sheet comprising a second skin sheet roller and said plurality of forming mandrels.

9. An apparatus as defined in claim 8 wherein said second skin sheet roller is maintained at a cool temperature, and said roller is disposed to contact an outer surface of said second skin sheet after said contact surface of said skin sheet has been heated by said heating means, whereby said outer surface will be cooled by said roller to a temperature below the temperature of the contact surface.

10. An apparatus as defined in claim 1 wherein each of said first and second heating means comprises an infrared-type heater.

11. An apparatus as defined in claim 5 wherein each of said first, second and third heating means comprises an infrared-type heater.

* * * * *